(12) United States Patent
Thrasher et al.

(10) Patent No.: US 10,901,096 B2
(45) Date of Patent: Jan. 26, 2021

(54) ANTENNA PHASE VARIATION CORRECTION

(71) Applicant: QUALCOMM Incorporated, San Diego, CA (US)

(72) Inventors: Robert Thrasher, Irvine, CA (US); Guojiang Gao, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 477 days.

(21) Appl. No.: 15/376,519

(22) Filed: Dec. 12, 2016

(65) Prior Publication Data

US 2018/0164442 A1 Jun. 14, 2018

(51) Int. Cl.
| | | |
|---|---|---|
| *G01S 19/44* | (2010.01) | |
| *G01S 19/54* | (2010.01) | |
| *G01S 19/43* | (2010.01) | |
| G01S 19/42 | (2010.01) | |
| G01S 19/40 | (2010.01) | |

(52) U.S. Cl.
CPC ............. *G01S 19/44* (2013.01); *G01S 19/43* (2013.01); *G01S 19/54* (2013.01); *G01S 19/40* (2013.01); *G01S 19/42* (2013.01)

(58) Field of Classification Search
CPC .......... G01S 19/44; G01S 19/43; G01S 19/40; G01S 19/42; G01S 19/54
USPC ............. 342/357.27, 357.26, 357.23, 357.25
See application file for complete search history.

(56) References Cited

U.S. PATENT DOCUMENTS

| | | | |
|---|---|---|---|
| 6,208,302 B1 | 3/2001 | Jacob | |
| 6,598,009 B2* | 7/2003 | Yang | G01S 3/36 342/357.52 |
| 7,382,313 B1 | 6/2008 | Goad | |
| 8,633,854 B2* | 1/2014 | Fenton | G01S 19/23 342/357.37 |
| 8,669,900 B2 | 3/2014 | Vollath | |
| 9,157,999 B2 | 10/2015 | Leandro et al. | |
| 9,369,843 B2 | 6/2016 | Rudow et al. | |
| 9,417,330 B2* | 8/2016 | Revol | G01S 19/42 |
| 10,056,993 B2* | 8/2018 | Clancy | H04L 1/246 |
| 10,162,060 B2* | 12/2018 | Jaeckle | G01S 19/215 |
| 10,305,540 B2* | 5/2019 | McLaughlin | H04B 1/7163 |
| 10,320,461 B2* | 6/2019 | Rappaport | H04B 7/0617 |
| 10,523,288 B2* | 12/2019 | Tomioka | H04B 7/043 |
| 2008/0122686 A1 | 5/2008 | Wirola | |
| 2010/0060507 A1* | 3/2010 | Raba | G01J 5/08 342/13 |
| 2011/0090113 A1* | 4/2011 | Fenton | G01S 19/54 342/357.36 |
| 2013/0241768 A1 | 9/2013 | Petersen et al. | |
| 2015/0293233 A1 | 10/2015 | De Jong | |

(Continued)

OTHER PUBLICATIONS

"International Search Report and Written Opinion—PCT/US2017/060904—ISA/EPO—dated Jan. 22, 2018".

*Primary Examiner* — Chuong P Nguyen
(74) *Attorney, Agent, or Firm* — Hunter Clark PLLC (57) ABSTRACT

A positioning method includes: receiving a positioning signal at a receiver from a positioning satellite; determining an angle of arrival of the positioning signal relative to the receiver; applying a phase correction to the positioning signal, based on the angle of arrival, to produce a phase-corrected signal; and determining a location of the receiver using the phase-corrected signal.

31 Claims, 8 Drawing Sheets

(56) References Cited

U.S. PATENT DOCUMENTS

2016/0103199 A1* 4/2016 Rappaport ............... G01S 3/42
                                                    342/377
2016/0327631 A1* 11/2016 Salokannel ............. G01S 5/12
2017/0108579 A1* 4/2017 Irvine .................... G01S 5/08
2018/0284149 A1* 10/2018 Kommi ............... G01C 21/165

\* cited by examiner

| Az/El | 90 | 80 | ... | 10 | 0  | -10 | ... | -80 | -90 |
|-------|----|----|-----|----|----|----|-----|-----|-----|
| 90    | -3 | -3 |     |    |    |    |     |     |     |
| 80    | -2 | -2 |     |    |    |    |     |     |     |
| ...   |    |    |     |    |    |    |     |     |     |
| 10    |    |    |     | -1 | -2 |    |     |     |     |
| 0     |    |    |     | -2 | -2 | -3 |     |     |     |
| -10   |    |    |     | -2 |    |    |     |     |     |
| ...   |    |    |     |    |    |    |     |     |     |
| -80   |    |    |     |    |    |    |     | -6  | -5  |
| -90   |    |    |     |    |    |    |     | -7  | -6  |

| Az/El | 90   | 80   | ... | 10   | 0    | -10  | ... | -80  | -90  |
|-------|------|------|-----|------|------|------|-----|------|------|
| 90    | -323 | -310 |     |      |      |      |     |      |      |
| 80    | -312 | -262 |     |      |      |      |     |      |      |
| ...   |      |      |     |      |      |      |     |      |      |
| 10    |      |      |     | -179 | -186 |      |     |      |      |
| 0     |      |      |     | -197 | -187 | -193 |     |      |      |
| -10   |      |      |     | -208 |      |      |     |      |      |
| ...   |      |      |     |      |      |      |     |      |      |
| -80   |      |      |     |      |      |      |     | -243 | -261 |
| -90   |      |      |     |      |      |      |     | -248 | -272 |

ANTENNA PHASE VARIATION CORRECTION

BACKGROUND

Decimeter or even centimeter-level position determination is important for many applications such as auto-pilot vehicle navigation. For such applications, typically a geodetic-grade antenna is used to receiving positioning signals. Geodetic-grade antennas have well-defined phase centers and very little phase variation across elevation or azimuth angles relative to the antennas. The phase variation is typically so little that the phase variation may be ignored when using received positioning signals to determine position of a device receiving the positioning signals. Geodetic antennas are impractically expensive for many applications such that non-geodetic antennas are used. Non-geodetic antennas may, however, have phase variations of magnitudes great enough that determining a number of carrier cycles of signal offset becomes impractical, if not impossible, such that decimeter or centimeter-level position determination is impractical or impossible.

SUMMARY

An example positioning method includes: receiving a positioning signal at a receiver from a positioning satellite; determining an angle of arrival of the positioning signal relative to the receiver; applying a phase correction to the positioning signal, based on the angle of arrival, to produce a phase-corrected signal; and determining a location of the receiver using the phase-corrected signal.

Implementations of such a method may include one or more of the following features. Applying the phase correction comprises applying a carrier-phase correction to the positioning signal. Applying the phase correction comprises applying a code-phase correction to the positioning signal. The phase-corrected signal is a code-phase-corrected signal, the method further comprises applying a carrier-phase correction to the positioning signal to produce a carrier-phase-corrected signal, and determining the location of the receiver comprises using the code-phase-corrected signal and using the carrier-phase-corrected signal. Using the code-phase-corrected signal comprises using the code-phase-corrected signal to determine a coarse location of the receiver and using the carrier-phase-corrected signal comprises using the carrier-phase-corrected signal to determine a precise location of the receiver.

Also or alternatively, implementations of such a method may include one or more of the following features. The method further includes retrieving the phase correction for the angle of arrival for each of the plurality of positioning signals from a look-up table stored by the receiver. Determining the angle of arrival of the positioning signal comprises: determining an orientation of the receiver relative to a reference; determining an estimated location of the receiver relative to the reference; and determining a location of the positioning satellite relative to the estimated location of the receiver. Receiving the positioning signal at the receiver from the positioning satellite comprises receiving a plurality of positioning signals at the receiver from a corresponding plurality of positioning satellites, and determining the location of the receiver using the phase-corrected signal comprises determining the location of the receiver using a quantity of the plurality of positioning signals, and the quantity of the plurality of positioning signals depends upon a position uncertainty of the receiver.

An example system includes: an antenna configured to receive a positioning signal from a positioning satellite; a memory; and a processor communicatively coupled to the antenna and communicatively coupled to, or including, the memory, the processor being configured to: determine an angle of arrival of the positioning signal relative to the antenna; apply a phase correction to the positioning signal to produce a phase-corrected signal, the phase correction being based on the angle of arrival; and determine a location of the system using the phase-corrected signal.

Implementations of such a system may include one or more of the following features. To apply the phase correction the processor is configured to apply a carrier-phase correction to the positioning signal. To apply the phase correction the processor is configured to apply a code-phase correction to the positioning signal. The phase-corrected signal is a code-phase-corrected signal, the processor is further configured to apply a carrier-phase correction to the positioning signal to produce a carrier-phase-corrected signal, and to determine the location of the system the processor is configured to use the code-phase-corrected signal and to use the carrier-phase-corrected signal. The processor is configured to use the code-phase-corrected signal to determine a coarse location of the system and to use the carrier-phase-corrected signal to determine a precise location of the system.

Also or alternatively, implementations of such a system may include one or more of the following features. The processor is further configured to retrieve the phase correction for the angle of arrival for the positioning signal from a look-up table stored in the memory. The antenna is a patch antenna. The system is a mobile wireless communication device. The system further includes an orientation sensor, and to determine the angle of arrival of the positioning signal, the processor is configured to: determine an orientation of the system relative to a reference; determine an estimated location of the system relative to the reference; and determine a location of the positioning satellite relative to the estimated location of the system. To determine the location of the system the processor is configured to determine the location of the system using a plurality of positioning signals, where a quantity of the plurality of positioning signals depends upon a position uncertainty of the system.

Another example of a system includes: receiving means for receiving a positioning signal from a positioning satellite; first determining means, communicatively coupled to the receiving means, for determining an angle of arrival of the positioning signal relative to the receiving means; applying means, communicatively coupled to the first determining means, for applying a phase correction to the positioning signal, based on the angle of arrival, to produce a phase-corrected signal; and second determining means, communicatively coupled to the applying means, for determining a location of the system using the phase-corrected signal.

Implementations of such a system may include one or more of the following features. The applying means are for applying a carrier-phase correction to the positioning signal. The applying means are for applying a code-phase correction to the positioning signal. The phase-corrected signal is a code-phase-corrected signal, the applying means are first applying means, the system further comprises second applying means for applying a carrier-phase correction to the positioning signal to produce a carrier-phase-corrected signal, and the second determining means are for determining the location of the system by using the code-phase-corrected signal to determine a coarse location of the system, using the coarse location of the system to determine a search window for determining a number of carrier cycles from a satellite to the system, and using the carrier-phase-corrected signal to determine a precise location of the system.

Also or alternatively, implementations of such a system may include one or more of the following features. For determining the angle of arrival of the positioning signal, the first determining means are for: determining an orientation of the receiving means relative to a reference; determining an estimated location of the system relative to the reference; and determining a location of the positioning satellite relative to the estimated location of the system. The receiving means are for receiving a plurality of positioning signals from a corresponding plurality of positioning satellites, and the second determining means are for determining the location of the system using a quantity of the plurality of positioning signals, where the quantity of the plurality of positioning signals depends upon a position uncertainty of the receiver.

An example of a non-transitory, processor-readable storage medium stores processor-readable instructions configured to cause a processor to: determine, for a positioning signal received by an antenna of a device from a positioning satellite, an angle of arrival of the positioning signal relative to the antenna; apply a phase correction to the positioning signal to produce a phase-corrected signal, the phase correction being based on the angle of arrival; and determine a location of the device using the phase-corrected signal.

Implementations of such a storage medium may include one or more of the following features. To apply the phase correction the instructions are configured to cause the processor to apply a carrier-phase correction to the positioning signal. To apply the phase correction the instructions are configured to cause the processor to apply a code-phase correction to the positioning signal. The phase-corrected signal is a code-phase-corrected signal, the instructions further include instructions configured to cause the processor to apply a carrier-phase correction to the positioning signal to produce a carrier-phase-corrected signal, and to determine the location of the device the instructions are configured to cause the processor to: use the code-phase-corrected signal to determine a coarse location of the device; use the coarse location of the device to determine a search window for determining a number of carrier cycles from a satellite to the device; and use the carrier-phase-corrected signal to determine a precise location of the device.

Also or alternatively, implementations of such a storage medium may include one or more of the following features. To determine the angle of arrival of the positioning signal, the instructions are configured to cause the processor to: determine an orientation of the device relative to a reference; determine an estimated location of the device relative to the reference; and determine a location of the positioning satellite relative to the estimated location of the device. To determine the location of the device the instructions are configured to cause the processor to use a plurality of positioning signals, where a quantity of the plurality of positioning signals depends upon a position uncertainty of the device.

DETAILED DESCRIPTION

Techniques are discussed for determining precise position of a mobile device. For example, a mobile wireless communication device such as a smartphone can compensate for phase variation introduced by an antenna of the device to positioning signals received from satellites. For example, the device may store a look-up table that has phase corrections for various combinations of azimuth and elevation angles corresponding to angles of arrival of the positioning signals. The phase corrections may be based on designs of the antenna and the smartphone, or may be measured for each device during a calibration phase of manufacturing. If based on the designs, the phase corrections may be determined by measuring phase for various angles of arrival using a sample device made according to the designs, and the same corrections used for other devices made according to those designs. The device can determine the angles of arrival of the positioning signals, look up the appropriate phase corrections, apply the phase corrections, and use the phase-corrected signals to determine a position of the device. The phase corrections may be applied to the positioning signals to compensate for code-phase error and for carrier-phase error. The code-phase error is error in phase of a code such as a pseudorandom number (PN) code used in satellite positioning systems (SPS). The carrier-phase error is error in phase of a carrier signal used to convey the code. The device may use the phase-corrected signals to align the code with a device-generated code to determine a coarse location of the device, and use the phase-corrected signals to determine carrier phase offset to determine a precise (fine) location of the device.

Figure 1:
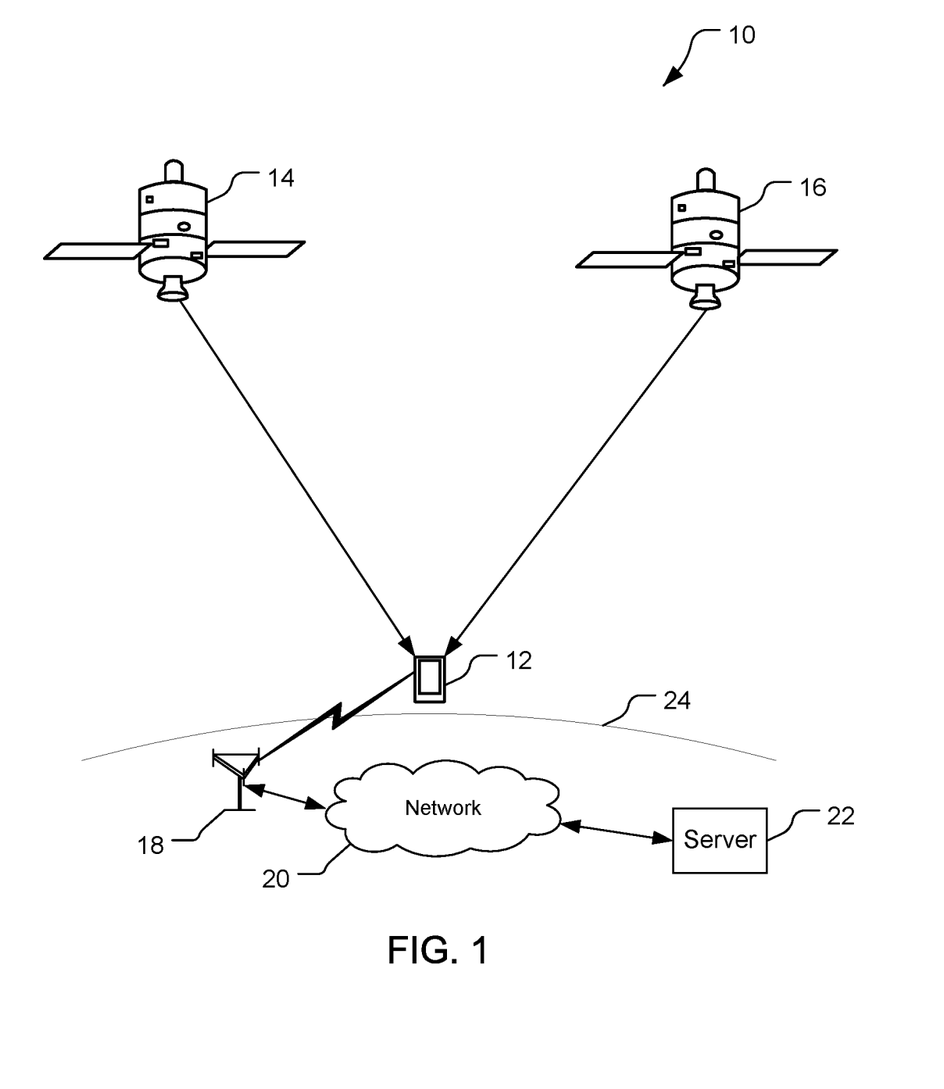
FIG. 1 is a schematic diagram of an example operating environment of a positioning system.

With reference to FIG. 1, shown is a schematic diagram of an example operating environment 10 includes a mobile device 12 (also referred to as a mobile wireless communication device, a UE, or a mobile station), satellites 14, 16, a base station 18, a network 20, and a server 22. The mobile device 12 is shown as a smartphone, the mobile device 12 may be any of a variety of mobile devices such as a handset, a tablet computer, a wearable device, an augmented reality device, a virtual reality device, a headset, a unoccupied aerial vehicle (UAV, as known as a drone) or other mobile robotic device, etc. While only the two satellites 14, 16 are shown, more satellites will typically be included in the operating environment 10 to provide desired location determination resolution. The satellites 14, 16 are configured to send positioning signals, e.g., positioning reference signals (PRS), using a carrier frequency and conveying a code. For example, a carrier signal having the carrier frequency may be amplitude modulated by each of the satellites 14, 16 to form codes such as PN codes, with each of the satellites 14, 16 encoding a different code that is unique to that satellite. The positioning signals are sent by the satellites 14, 16 to Earth 24 for reception by devices such as the mobile device 12. The base station 18, the network 20, and the server 22 are optional. The base station 18 is configured to communicate wirelessly with the mobile device 12 and to communicate, e.g., through a wired and/or a wireless connection, to the network 20. The server 22 is communicatively coupled to, and configured to communicate with, the network 20. The server 22 is configured with a processor and memory similar to the discussion below with respect to the mobile device 12 and may be configured to receive indications of signals received by the mobile device 12 from the satellites 14, 16, to store and/or apply phase corrections to the indications of the received signals, and/or to determine a coarse (coarse-resolution) location and/or a precise (fine-resolution) location of the mobile device 12, e.g., as discussed below.

Figure 2:
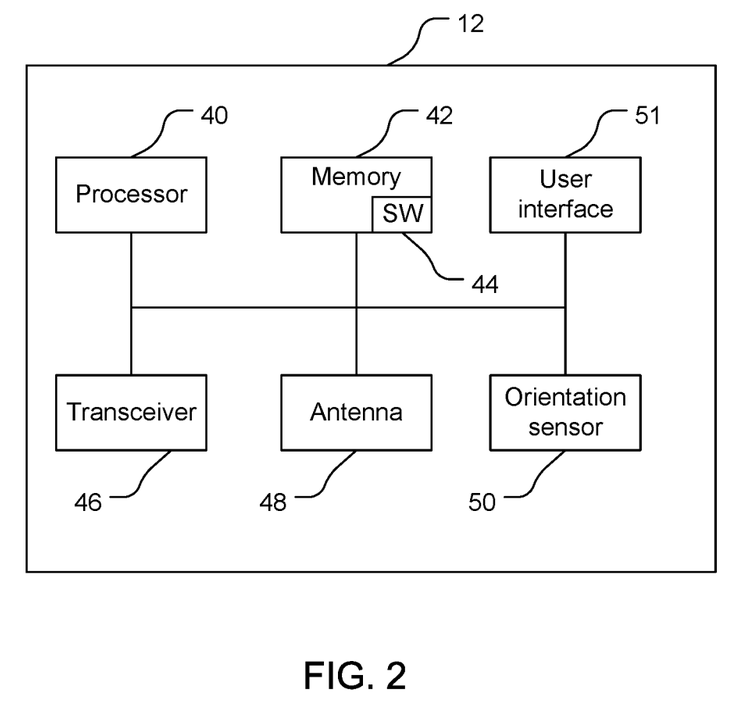
FIG. 2 is a block diagram of a mobile device shown in FIG. 1.

Referring to FIG. 2, with further reference to FIG. 1, the mobile device 12 comprises a computer system including a processor 40, a memory 42 including software 44 (SW), a transceiver 46, an antenna 48, an orientation sensor 50, and a user interface 51. The processor 40 is preferably an intelligent hardware device, for example a central processing unit (CPU), a microcontroller, an application specific integrated circuit (ASIC), etc. The processor 40 may comprise multiple separate physical entities that can be distributed in the mobile device 12. The memory 42 may include random access memory (RAM) and/or read-only memory (ROM). The memory 42 is a non-transitory, processor-readable storage medium that stores the software 44 which is processor-readable, processor-executable software code containing instructions that are configured to, when performed, cause the processor 40 to perform various functions described herein. The description may refer only to the processor 40 performing the functions, but this includes other implementations such as where the processor 40 executes software and/or firmware. The software 44 may not be directly executable by the processor 40 and instead may be configured to, for example when compiled and executed, cause the processor 40 to perform the functions. Whether needing compiling or not, the software 44 contains the instructions to cause the processor 40 to perform the functions. The processor 40 is communicatively coupled to the memory 42 and the transceiver 46. The processor 40 in combination with the memory 42 provide means for performing functions as described herein, for example, receiving satellite positioning signals, applying phase corrections to the signals, determining distances to the satellites using the phase-corrected signals, and determining a location of the mobile device 12 using the determined distances. Although only one antenna is indicated, and the antenna 48 is referred to in the singular form, the antenna 48 may include more than one antenna, e.g., an antenna for receiving satellite signals, and one or more antennas for terrestrial communication (e.g., one or more cellular antennas, a WLAN antenna, a BLUETOOTH antenna, etc.).

The transceiver 46 is communicatively coupled to the processor 40, the memory 42, and the antenna 48, and is configured to convey signals between the processor 40 and the antenna 48. The transceiver 46 is configured to convey signals received from the satellites 14, 16 to the processor 40. Further, the transceiver 46 is configured to send signals from the processor 40 via the antenna 48 to the base station 18 for transmission to the server 22 via the network 20. For example, the transceiver 46 may convey indications of positioning signals received from the satellites 14, 16, including indications of timing and angle of signal reception.

The orientation sensor 50 is configured, either alone or in combination with the processor 40, to determine an orientation of the mobile device 12. While labeled in the singular, the orientation sensor 50 may include more than one sensor. For example, the orientation sensor 50 may include one or more accelerometers, one or more magnetometers, a compass, one or more cameras, and/or any other appropriate device(s). The orientation sensor 50 is configured to determine, and/or to provide information to the processor 40 that is configured to determine, an orientation of the mobile device 12 relative to a reference. The reference may be, for example, coordinate axes located at a center, or a surface of Earth, or the surface of a fictional sphere having a center at the center of Earth and a radius equal to a distance from the center of Earth to the mobile device 12 (i.e., relative to Earth with Earth assumed to be spherical and to have a radius such that the mobile device 12 is on the surface of Earth).

The user interface 51 is configured to provide information to, and receive information from, a user. For example, the user interface may include a touch-sensitive screen, a microphone, and a speaker. The user interface 51 may provide information to the user as directed by the processor 40, e.g., to prompt the user to hold the mobile phone in a desired orientation relative to a reference, e.g., with the screen parallel to a local surface of Earth and a direction from a bottom edge of the mobile device 12 to a top edge of the mobile device 12 pointing to magnetic north or toward true north (e.g., in accordance with a visual prompt, such as a compass or arrow indicating magnetic north or true north, displayed on the screen). The user interface 51 may receive and provide information from a user to the processor 40, e.g., an indication that the mobile device 12 is oriented as discussed above.

The processor 40 is configured to use the orientation of the mobile device 12 relative to the reference to determine an orientation of the mobile device relative to each of the satellites 14, 16. Thus, the processor 40 is configured to determine an angle of arrival of a signal from each of the satellites 14, 16 at the mobile device 12, e.g., relative to the antenna 48. The processor 40 could be configured to determine the angle of arrival for less than all of the satellites from which positioning signals are received (e.g., discontinuing to determine angles of arrival once a threshold number of determined angles of arrivals has been met). The processor 40 is configured to use the orientation of the mobile device 12 relative to the reference, a location of the mobile device 12, identities of satellites associated with the signals, and information regarding positions of the satellites 14, 16 relative to Earth (e.g., SPS ephemeris information) to determine the angle of arrival of each signal corresponding to each satellite 14, 16. The processor 40 may determine the location of the mobile device 12, e.g., an estimated location, in a variety of ways such as using a location of a cellular base station from which the mobile device 12 receives a strongest signal, using trilateration with satellite signals without phase-compensating the satellite signals and/or with terrestrial signals such as cellular base station signals and/or WiFi access point signals and known locations of the sources of such signals. The processor 40 can determine the identities of the satellites by correlating each of the signals with a known code associated with a respective satellite. The processor 40 is configured to determine the angles of arrival dynamically, e.g., in real time (e.g., within 0.1 seconds), as the angles of arrival depend upon motion of the mobile device 12 relative to the satellites 14, 16. Also or alternatively, information regarding received positioning signals may be stored in association with orientation information corresponding to when the received positioning signals were received such that the processor 40 can determine the angle of arrival of each signal in real time or more slowly.

Figure 3:
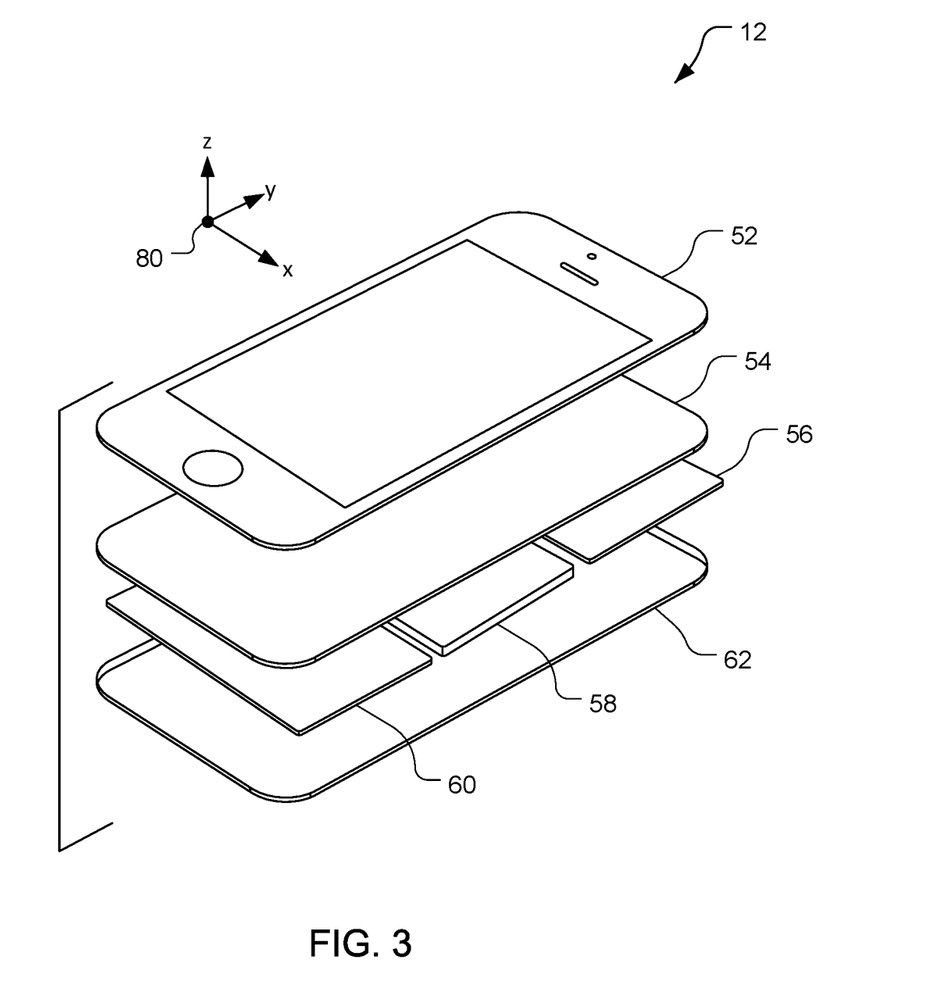
FIG. 3 is an exploded perspective view of simplified components of the mobile device shown in FIG. 2.
Figure 4:
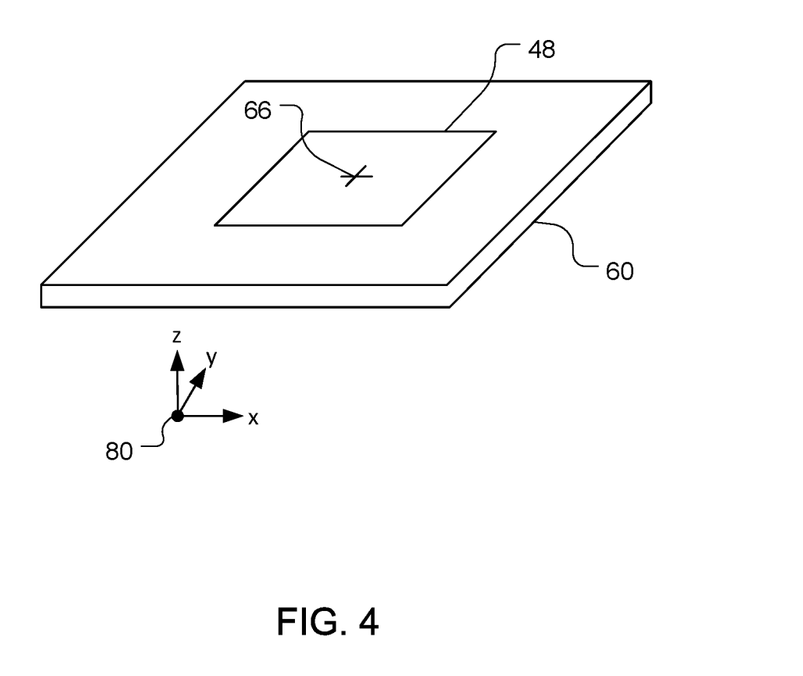
FIG. 4 is a perspective view of an antenna printed circuit board shown in FIG. 3.

Referring also to FIGS. 3-4, the mobile device 12 includes a top cover 52, a display 54, a main printed circuit board (PCB) 56, a battery 58, an antenna PCB 60, and a bottom cover 62. The mobile device 12 as shown may be a smartphone or a tablet computer but the discussion is not limited to such devices. The antenna PCB 60 is communicatively coupled to the main PCB 56 to facilitate bi-directional communication between antennas of the antenna PCB 60 and a processor, e.g., the processor 40, of the main PCB 56. The antenna PCB 60 includes the antenna 48, here a patch antenna, that is configured to receive satellite positioning signals from the satellites 14, 16. The antenna 48, in combination with one or more other parts of the mobile device 12 such as the top cover 52 and the display 54, introduces some phase error to signals received by the antenna 48. The phase error introduced will typically be different for different angles of arrival of the signals. For example, the phase error may be different for different elevation angles and for different azimuth angles. Here, a reference coordinate system 80 has a z-axis perpendicular to a plane of the antenna 48, a y-axis extending along a length of the mobile device 12, and an x-axis extending across a width of the mobile device 12. Boresight is in a positive z-axis direction from a center 66 of the antenna 48. Angles from the positive z-axis toward a positive y-axis are considered positive elevation angles, angles from the positive z-axis toward the negative y-axis are considered negative elevation angles, angles from the positive z-axis toward the positive x-axis are considered positive azimuth angles, and angles from the positive z-axis toward the negative y-axis are considered negative azimuth angles, although these designations are arbitrary.

Figure 5:
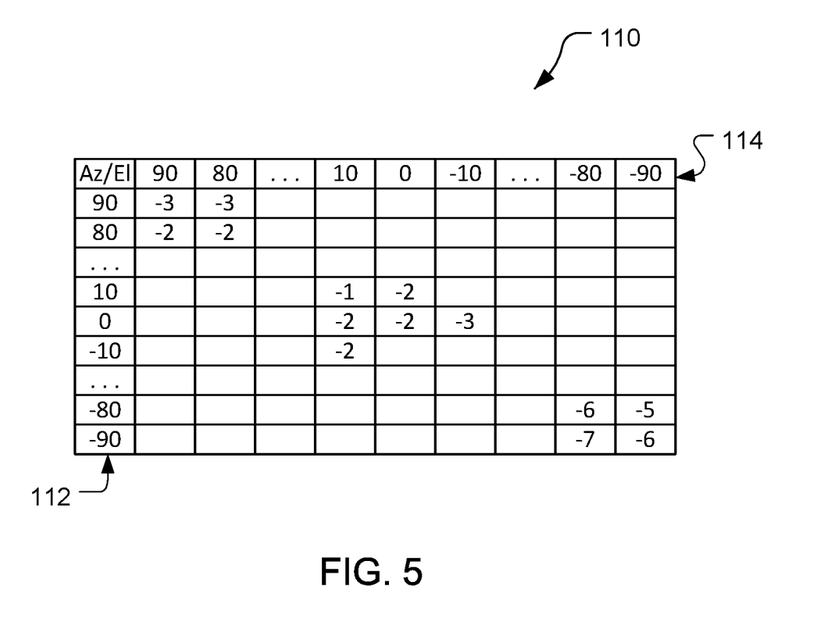
FIG. 5 is an example of a code-phase correction table stored in a memory shown in FIG. 2.
Figure 7:
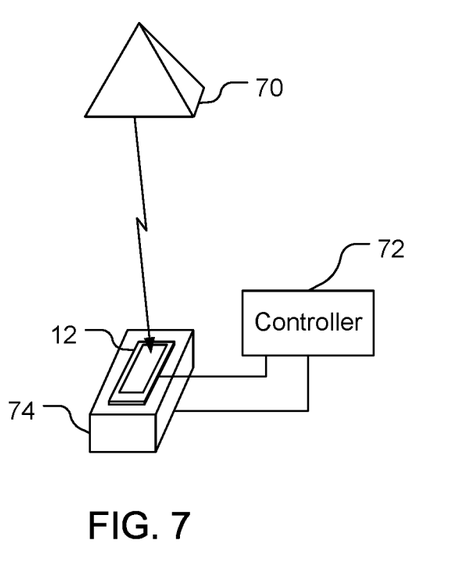
FIG. 7 is a simplified perspective view of a calibration system for generating the phase-correction tables shown in FIGS. 5-6.

Referring to FIG. 5, with further reference to FIGS. 1-4, a look-up table 110 of code-phase corrections for the antenna 48 is stored in the memory 42. The code-phase corrections are pre-stored in the memory 42 and may be based on the configuration of the mobile device 12, e.g., at least the antenna 48, the top cover 52, and the display 54, or may have been measured during a calibration phase of manufacturing of the mobile device 12. For example, referring to FIG. 7, during manufacture a transmitting antenna 70, here a horn antenna, can transmit a signal with a code while the mobile device is rotated about two axes so that the mobile device 12 received the signal from the antenna 70 with different angles of arrival to fill the look-up table 110 as desired (i.e., with a desired resolution of angles of arrival). The angle of arrival can be determined and indicated to the mobile device 12 by a controller 72 that controls the positioning of the mobile device 12 by controlling a position of a gimbal 74 using a servo (not shown).

Returning to FIG. 5, example code-phase corrections are shown in the look-up table 110 for illustrative purposes. For simplicity and ease of illustration, not all phase corrections for the look-up table 110 are shown. Also, the look-up table 110 stores code-phase corrections for ten-degree-increment combinations, but more detailed angle combinations may be used, e.g., in quarter-degree increments, half-degree increments, one-degree increments, two-degree increments, or other increments. Further, the angle increments may be different in elevation versus azimuth, e.g., half-degree increments in elevation and quarter-degree increments in azimuth. Also, while the code-phase corrections are shown with whole-degree resolution, as code-phase errors are typically on the order of a meter, other resolutions, e.g., tenth of a degree, hundredth of a degree, etc., may be used. As shown, the code-phase corrections are negative, indicating that the correction will shift the signal up in time, i.e., to the left on a plot of the signal amplitude versus time with time extending to the right due to delay introduced into the signal. In the look-up table 110, azimuth indicators 112 in the left-most column indicate azimuth angles and elevation indicators 114 in the top-most row indicate elevation angles. For example, an angle of arrival of −10° azimuth and +10° elevation should receive a code-phase correction of −2°.

Figure 6:
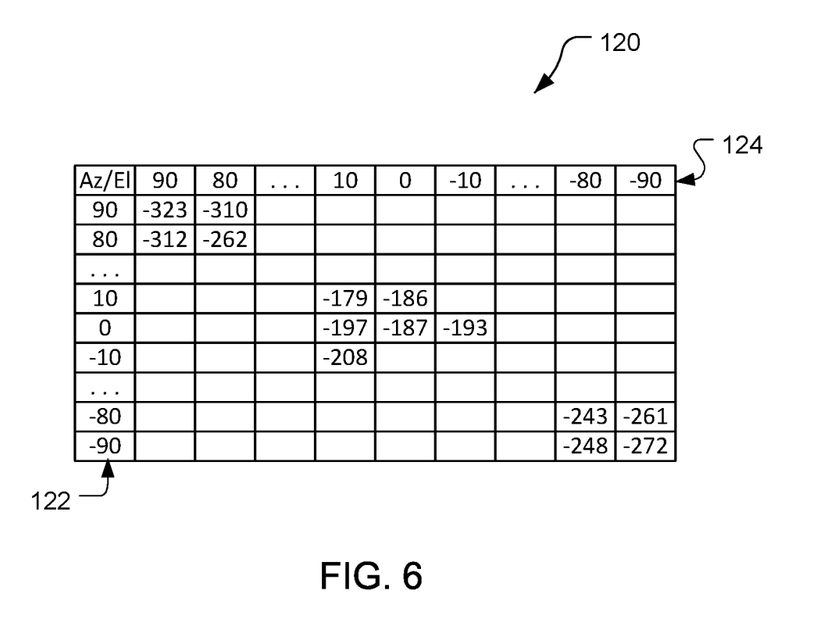
FIG. 6 is an example of a carrier-phase correction table stored in the memory shown in FIG. 2.

Referring to FIG. 6, with further reference to FIGS. 1-4, a look-up table 120 of carrier-phase corrections for the antenna 48 is stored in the memory 42. The carrier-phase corrections are given in degrees, i.e., degrees of phase shift such that 360° would be one full cycle of phase shift. The carrier-phase corrections are pre-stored in the memory 42 and may be based on the configuration of the mobile device 12, e.g., at least the antenna 48, the top cover 52, and the display 54, or may have been measured during a calibration phase of manufacturing of the mobile device 12, e.g., using the configuration shown in FIG. 7 as discussed above.

Returning to FIG. 6, example carrier-phase corrections are shown in the look-up table 120 for illustrative purposes. For simplicity and ease of illustration, not all phase corrections for the look-up table 120 are shown. Also, the look-up table 120 stores carrier-phase corrections for ten-degree-increment combinations, but more detailed angle combinations may be used, e.g., in quarter-degree increments, half-degree increments, one-degree increments, two-degree increments, or other increments. Further, the angle increments may be different in elevation versus azimuth, e.g., half-degree increments in elevation and quarter-degree increments in azimuth. Also, while the carrier-phase corrections are shown with one-degree resolution, as carrier-phase errors are typically on the order of a centimeter, other resolutions, e.g., tenth-of-a degree, five-degree, 10-degree, etc., may be used. As shown, the carrier-phase corrections are negative, indicating that the correction will shift the signal up in time, i.e., to the left on a plot of the signal amplitude versus time with time extending to the right due to delay introduced into the signal. In the look-up table 120, azimuth indicators 122 in the left-most column indicate azimuth angles and elevation indicators 124 in the top-most row indicate elevation angles. For example, an angle of arrival of −10° azimuth and +10° elevation should receive a code-phase correction of −208°.

Figure 8A:
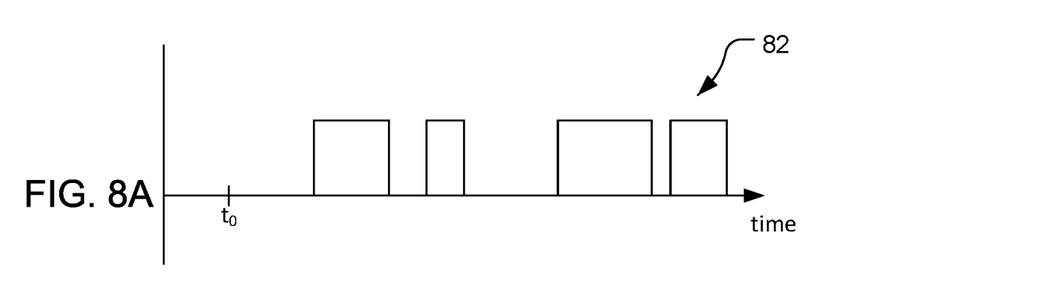
FIGS. 8A-8B are timing diagrams of a code signal and a code-phase-corrected signal respectively.
Figure 8B:
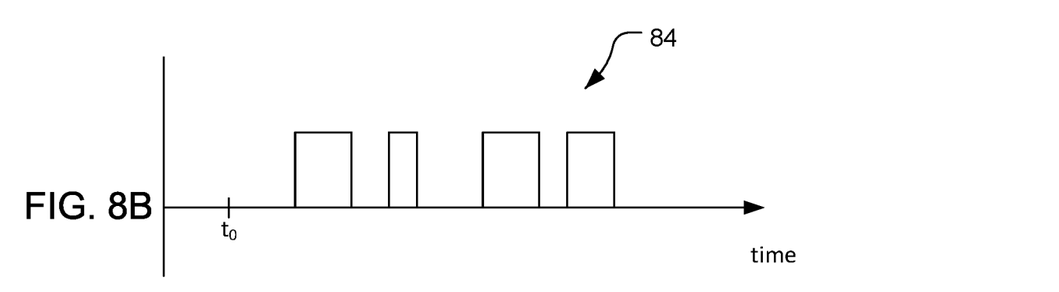

Referring to FIGS. 8A-8B, with further reference to FIGS. 1-5, the processor 40 is configured to apply a code-phase correction to a signal received by the antenna 48 to determine a code-phase-corrected signal. Here, having determined an angle of arrival as discussed above, and having associated signals with satellites from IDs in the signals, the processor 40 is configured to apply an appropriate code-phase correction in the look-up table 110 to a signal received by the antenna 48 to adjust a phase of a code conveyed by the signal to produce a code-phase-corrected signal. The applied code-phase correction corrects a phase of the code conveyed by the signal. Here a code signal 82, such as a PN code, has one or more phase errors introduced by the mobile device 12 that cause the code signal 82 to appear to be of a different shape that when transmitted by a satellite (i.e., with one or more rising and/or falling edges being shifted in time relative to a reference point, e.g., an initial rising edge, and/or to when the edge(s) would be received without the phase error), and possibly to have a reference point (e.g., an initial rising edge) shifted in time relative to no phase error being introduced. The processor 40 is configured to determine the angle(s) of arrival of the signal during receipt of the signal, and to apply the appropriate code-phase correction(s), based on the angle(s) of arrival, to corresponding portions of the received signal to produce a code-phase-corrected signal 84 (i.e., a phase-corrected code). Thus, the processor 40 will apply different code-phase corrections for different portions of a positioning signal if the angle of arrival for the different portions of the positioning signal changes. The difference between the code-phase-corrected signal 84 and the code signal 82 without phase corrections is exaggerated for illustration. The code signal 82 and the code-phase-corrected signal 84 are referred to as signals, but are representations or interpretations of a modulated carrier signal, as square pulses as shown in FIG. 8A are not received but represent regions of the modulated signal that correspond to high and low level signal levels (e.g., logical 1's and logical 0's).

The code-phase-corrected signal 84 has a different shape and begins closer in time to a reference time $t_0$ when the code was transmitted from the respective satellite. The phase corrections applied by the processor 40 cannot make the received signal arrive earlier in time, but the processor 40 can apply the phase corrections to the data to show when the signal should have arrived. The shape of a code-phase-corrected signal will better match, both in shape and timing, the actual code signal transmitted by a respective one of the satellites 14, 16. Thus, when the processor 40 correlates the code-phase-corrected signal 84 with the known PN code for that satellite, the processor 40 will likely be able to match the code-phase-corrected signal 84 to the known PN code more accurately, and likely be able to determine the timing of receipt of the code-phase-corrected signal 84 more accurately, than if the processor 40 used the code signal 82 to match with the known PN code.

Figure 9A:
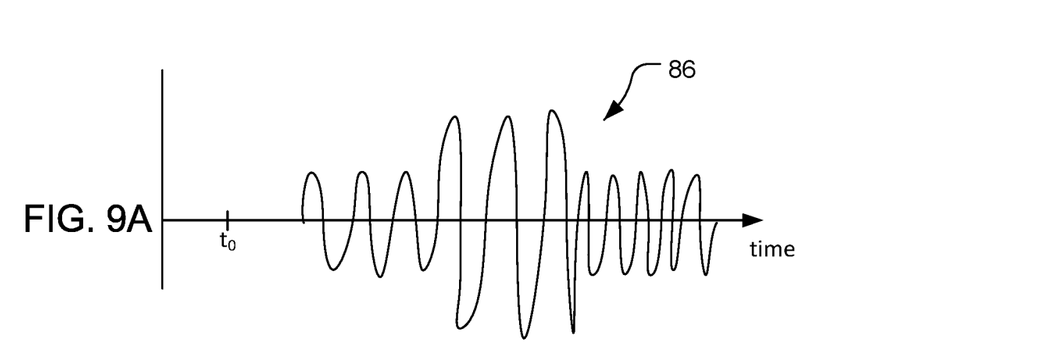
FIGS. 9A-9B are timing diagrams of a carrier signal and a carrier-phase-corrected signal respectively.
Figure 9B:
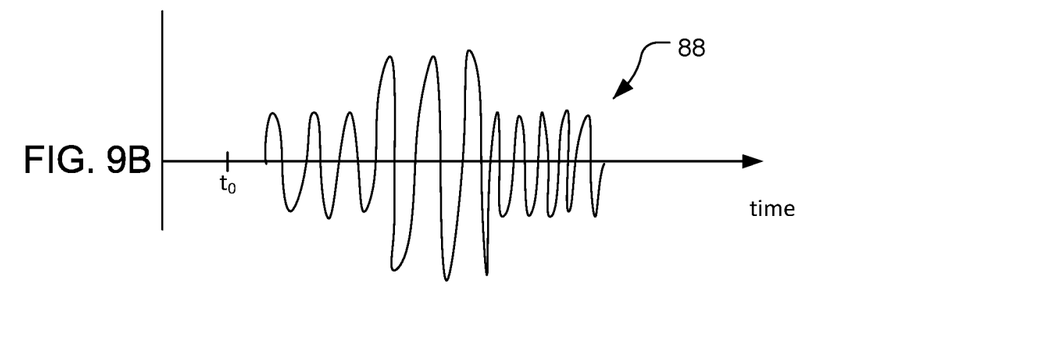

Similarly, referring to FIGS. 9A-9B, with further reference to FIGS. 1-5, the processor 40 is configured to apply a carrier-phase correction to a signal received by the antenna 48 to determine a carrier-phase-corrected signal. Here, the processor 40 is configured to apply an appropriate carrier-phase correction in the look-up table 120 to a signal received by the antenna 48 to adjust a phase of a carrier signal to produce a carrier-phase-corrected signal. The applied carrier-phase correction corrects a phase of the carrier signal received from a respective one of the satellites 14, 16. Here a carrier signal 86 has one or more phase errors introduced by the mobile device 12. The processor 40 is configured to determine the angle(s) of arrival of the signal during receipt of the signal, and to apply the appropriate carrier-phase correction(s), based on the angle(s) of arrival, to the corresponding portions of the received signal to produce a carrier-phase-corrected signal 88. Thus, the processor 40 will apply different carrier-phase corrections for different portions of a positioning signal if the angle of arrival for the different portions of the positioning signal changes. The difference between the carrier-phase-corrected signal 88 and the carrier signal 86 without phase corrections is exaggerated for illustration.

The carrier-phase-corrected signal 88 has a different shape and begins closer in time to a reference time $t_0$ when the code was transmitted from the respective satellite. The phase corrections applied by the processor 40 cannot make the received signal arrive earlier in time, but the processor 40 can apply the phase corrections to the data to show when the signal should have arrived. The shape of a carrier-phase-corrected signal will better match, both in shape and timing, the actual carrier signal transmitted by a respective one of the satellites 14, 16. Thus, when the processor 40 attempts to determine a number of carrier cycles between the mobile device 12 and the respective satellite 14, 16, the processor 40 will likely be able to determine the number of carrier-signal cycles more accurately than if the processor 40 used the carrier signal 86.

The processor 40 may apply the code-phase corrections and the carrier-phase corrections to the same positioning signals. Thus, the processor 40 may receive a positioning signal from a satellite, apply a code-phase correction to the received signal to produce a code-phase-corrected signal, and apply a carrier-phase correction to the received signal to produce a carrier-phase-corrected signal. The processor 40 may do the same for other positioning signals received from other satellites.

The processor 40 is configured to determine the location of the mobile device using one or both of the code-phase-corrected signal 84 and the carrier-phase-corrected signal 88. The processor 40 is configured to align a code with the code-phase-corrected signal 84 and knowledge (e.g., stored in the memory 42) of the codes of the satellites 14, 16 to determine the satellite 14, 16 from which the code was received. The processor 40 is further configured to determine the time of travel of the code from the satellite 14, 16 to the mobile device 12 using the timing of the code-phase-corrected signal 84 and knowledge of time of transmission of the code from the satellite 14, 16 to determine a distance to the satellite 14, 16. The processor 40 is configured to determine this distance for multiple satellites, e.g., four satellites, and to use trilateration to determine a coarse location of the mobile device 12 based on these distances and known locations of the satellites. The processor 40 is configured to determine a fine location of the mobile device 12 using the carrier-phase-corrected signal 88. The processor 40 is preferably configured to use the carrier-phase-corrected signal and one or more known techniques (e.g., real-time kinematic techniques) to determine a number of carrier signal cycles between the satellite from which the carrier signal 86 is received. The processor 40 is configured to use this number of cycles to determine a distance from the mobile device 12 to the satellite, to determine such distance for multiple satellites, and to determine a fine location (i.e., fine-resolution location) of the mobile device 12 by using trilateration with the determined distances and known locations of the satellites. The processor 40 may be configured to use the coarse location to assist in determining the fine location of the mobile device 12, e.g., by using the coarse location to reduce a search window for determining a number of carrier phase cycles from satellite to receiver for determining position using carrier phase.

Figure 10:
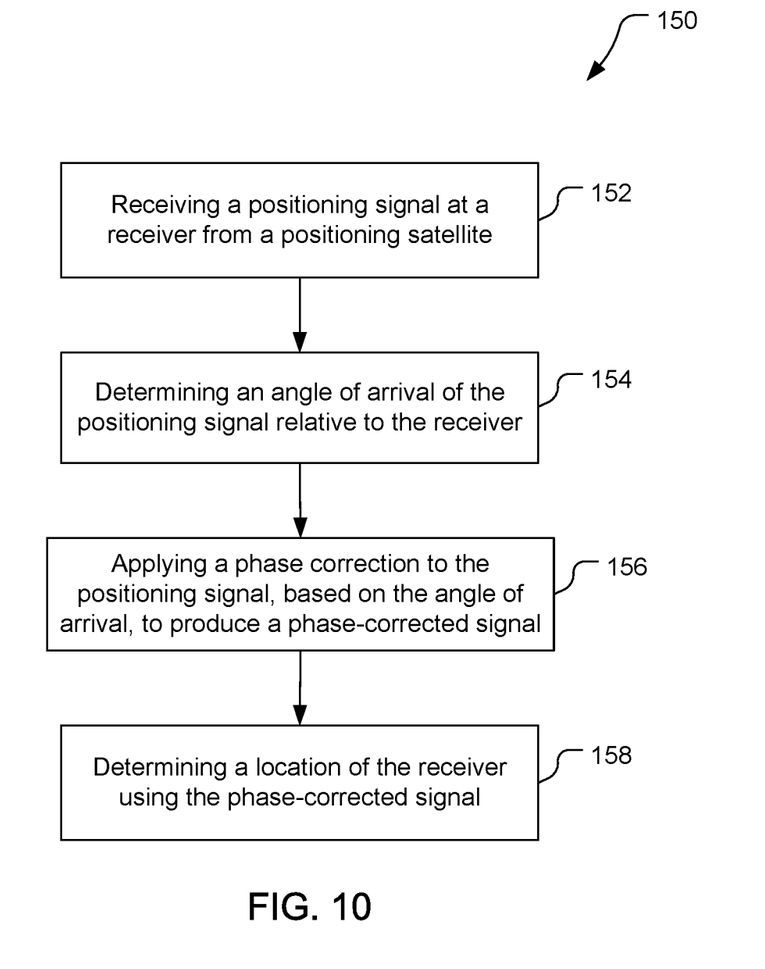
FIG. 10 is a block flow diagram of a positioning method.

Referring to FIG. 10, with further reference to FIGS. 1-9, a positioning method 150 includes the stages shown. The method 150 is, however, an example only and not limiting. The method 150 can be altered, e.g., by having stages added, removed, rearranged, combined, performed concurrently, and/or having single stages split into multiple stages.

At stage 152, the method 150 includes receiving a positioning signal at a receiver from a positioning satellite. For example, the antenna 48 receives a positioning signal from one of the satellites 14, 16. The antenna may receiving positioning signals from the satellites 14, 16 and preferably other satellites not shown.

At stage 154, the method 150 includes determining an angle of arrival of the positioning signal, relative to a receiver. For example, the processor 40 can determine an orientation of the mobile device 12 (and thus the antenna 48) relative to Earth by receiving an indication of the orientation from the orientation sensor 50 and/or processing information from the orientation sensor 50. Also or alternatively, the processor 40 could cause the user interface 51 to prompt the user to hold the mobile device 12 parallel to Earth (i.e., parallel to a surface of Earth at the location of the mobile device 12) and pointing toward magnetic north (or toward true north), and wait for an indication that the mobile device 12 is so oriented (e.g., an indication from the user that the mobile device 12 is oriented as prompted, or one or more indications from the orientation sensor 50 that the mobile device 12 is oriented as prompted). The processor 40 determines an estimated location of the mobile device 12 and uses the estimated location, the orientation of the mobile, and a known location of the satellite 14 to determine the angle of arrival of positioning signal from the satellite 14. Preferably, the processor 40 determines the angle of arrival for each signal from each of the satellites 14, 16 and other satellites not shown.

At stage 156, the method 150 includes applying a phase correction to the positioning signal, based on the angle of arrival, to produce a phase-corrected signal. The processor 40 determines an angle of arrival for an incoming satellite signal based on the orientation of the mobile device 12, a location estimate of the mobile device 12, a determined satellite that sent the signal, and knowledge of the location of the satellite, e.g., relative to the Earth at the present time. The processor 40 determines an appropriate phase correction for the signal, e.g., by looking up a code-phase correction from the look-up table 110 and/or a carrier-phase correction from the look-up table 120 for the angle of arrival, and applies the phase correction to the received positioning signal to produce a phase-corrected signal. The processor 40 applies the phase correction to the portion of the received signal corresponding to the angle of arrival for that portion of the received signal as the angle of arrival may change and be different for different portions of the received signal. The processor 40 preferably converts the code signal 82 into the code-phase-corrected signal 84 and converts the carrier signal 86 into the carrier-phase-corrected signal 88. Further, the processor 40 may apply phase corrections to multiple signals for the corresponding angles of arrival to produce multiple phase-corrected signals.

At stage 158, the method 150 includes determining a location of the receiver using the phase-corrected signal. The processor 40 may determine a phase-corrected signal for more than one satellite, although the processor 40 may not use all available phase-corrected signals. Preferably, however, the processor 40 uses more than one phase-corrected signal among the multiple carrier-phase signals used to determine a location of the mobile device 12. For example, the processor 40 may use multiple positioning signals where a quantity of positioning signals used depends on a position uncertainty of the mobile device 12 (e.g., a position uncertainty of a location estimate of the mobile device 12). The processor 40 may use more positioning signals the higher the position uncertainty is. The processor 40 may use all available positioning signals (i.e., signals from all visible satellites), and all corresponding phase-corrected signals, to determine the location of the mobile device 12, as using more phase-corrected signals will typically improve the accuracy of the determined location. For example, the processor 40 determines distances to the satellites 14, 16 (and other satellites) by aligning the code-phase-corrected signal to a reference code to determine travel times, and thus distances, from the satellites to the mobile device, and performing trilateration using these distances to determine the location of the mobile device 12, which may be thought of as a coarse location of the mobile device 12. Also or alternatively, the processor 40 determines distances to the satellites 14, 16 (and other satellites) by determining numbers of carrier wave cycles, and thus distances, from the satellites to the mobile device, and performing trilateration using these distances to determine the location of the mobile device 12, which may be thought of as a fine or precise location of the mobile device 12. The processor 40 may use the coarse location to help determine the fine location of the mobile device 12, e.g., by using the coarse location to reduce a search window for determining a number of carrier cycles for determining a carrier-phase-determined location, e.g., using real-time kinematic position determination.

Other Considerations

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

The term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system. Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

What is claimed is:

1. A positioning method comprising:
  receiving a positioning signal at a mobile device from a positioning satellite;
  using an orientation sensor to determine an angle of arrival of the positioning signal relative to the mobile device;
  applying, by a processor, a phase correction to the positioning signal, based on the angle of arrival, to produce a phase-corrected signal, the phase correction corresponding to a phase error that the mobile device is configured to introduce to a signal incident upon the mobile device at the angle of arrival; and
  determining, by the processor, a location of the mobile device using the phase-corrected signal.

2. The method of claim 1, wherein applying the phase correction comprises applying a carrier-phase correction to the positioning signal.

3. The method of claim 1, wherein applying the phase correction comprises applying a code-phase correction to the positioning signal.

4. The method of claim 3, wherein the phase-corrected signal is a code-phase-corrected signal, the method further comprises applying a carrier-phase correction to the positioning signal to produce a carrier-phase-corrected signal, and wherein determining the location of the mobile device comprises using the code-phase-corrected signal and using the carrier-phase-corrected signal.

5. The method of claim 4, wherein using the code-phase-corrected signal comprises using the code-phase-corrected signal to determine a coarse location of the mobile device and using the carrier-phase-corrected signal comprises using the carrier-phase-corrected signal to determine a precise location of the mobile device.

6. The method of claim 1, further comprising retrieving the phase correction for the angle of arrival for the positioning signal from a look-up table stored by the mobile device.

7. The method of claim 1, wherein determining the angle of arrival of the positioning signal further comprises:
  determining an orientation of the mobile device relative to a reference;

determining an estimated location of the mobile device relative to the reference; and determining a location of the positioning satellite relative to the estimated location of the mobile device.

8. The method of claim 7, further comprising:

determining the angle of arrival of the positioning signal based on the estimated location of the mobile device and the location of the positioning satellite relative to the estimated location of the mobile device.

9. The method of claim 1, wherein:

receiving the positioning signal at the mobile device from the positioning satellite comprises receiving a plurality of positioning signals at the mobile device from a corresponding plurality of positioning satellites; and determining the location of the mobile device using the phase-corrected signal comprises determining the location of the mobile device using a quantity of the plurality of positioning signals, wherein the quantity of the plurality of positioning signals depends upon a position uncertainty of the mobile device.

10. A system comprising:

an antenna configured to receive a positioning signal from a positioning satellite;

an orientation sensor;

a memory; and a processor communicatively coupled to the antenna and communicatively coupled to, or including, the memory, the processor being configured to:

use the orientation sensor to determine an angle of arrival of the positioning signal relative to the antenna;

apply a phase correction to the positioning signal to produce a phase-corrected signal, the phase correction being based on the angle of arrival, the phase correction corresponding to a phase error that the system is configured to introduce to a signal incident upon the system at the angle of arrival; and determine a location of the system using the phase-corrected signal.

11. The system of claim 10, wherein to apply the phase correction the processor is configured to apply a carrier-phase correction to the positioning signal.

12. The system of claim 10, wherein to apply the phase correction the processor is configured to apply a code-phase correction to the positioning signal.

13. The system of claim 12, wherein the phase-corrected signal is a code-phase-corrected signal, the processor being further configured to apply a carrier-phase correction to the positioning signal to produce a carrier-phase-corrected signal, and wherein to determine the location of the system the processor is configured to use the code-phase-corrected signal and to use the carrier-phase-corrected signal.

14. The system of claim 13, wherein the processor is configured to use the code-phase-corrected signal to determine a coarse location of the system and to use the carrier-phase-corrected signal to determine a precise location of the system.

15. The system of claim 10, wherein the processor is further configured to retrieve the phase correction for the angle of arrival for the positioning signal from a look-up table stored in the memory.

16. The system of claim 10, wherein the antenna is a patch antenna.

17. The system of claim 16, wherein the system is a mobile wireless communication device.

18. The system of claim 10, further comprising an orientation sensor, wherein to determine the angle of arrival of the positioning signal, the processor is further configured to:

determine an orientation of the system relative to a reference;

determine an estimated location of the system relative to the reference; and determine a location of the positioning satellite relative to the estimated location of the system.

19. The system of claim 10, wherein to determine the location of the system the processor is configured to determine the location of the system using a plurality of positioning signals, wherein a quantity of the plurality of positioning signals depends upon a position uncertainty of the system.

20. A system comprising:

receiving means for receiving a positioning signal from a positioning satellite;

first determining means, communicatively coupled to the receiving means, for determining an angle of arrival of the positioning signal relative to the receiving means using an orientation sensor;

applying means, communicatively coupled to the first determining means, for applying a phase correction to the positioning signal, based on the angle of arrival, to produce a phase-corrected signal, the phase correction corresponding to a phase error that the system is configured to introduce to a signal incident upon the system at the angle of arrival; and second determining means, communicatively coupled to the applying means, for determining a location of the system using the phase-corrected signal.

21. The system of claim 20, wherein the applying means are for applying a carrier-phase correction to the positioning signal.

22. The system of claim 20, wherein the applying means are for applying a code-phase correction to the positioning signal.

23. The system of claim 22, wherein the phase-corrected signal is a code-phase-corrected signal, wherein the applying means are first applying means, the system further comprises second applying means for applying a carrier-phase correction to the positioning signal to produce a carrier-phase-corrected signal, and wherein the second determining means are for determining the location of the system by using the code-phase-corrected signal to determine a coarse location of the system, using the coarse location of the system to determine a search window for determining a number of carrier cycles from a satellite to the system, and using the carrier-phase-corrected signal to determine a precise location of the system.

24. The system of claim 20, wherein for determining the angle of arrival of the positioning signal the first determining means are for:

determining an orientation of the receiving means relative to a reference;

determining an estimated location of the system relative to the reference; and determining a location of the positioning satellite relative to the estimated location of the system.

25. The system of claim 20, wherein:

the receiving means are for receiving a plurality of positioning signals from a corresponding plurality of positioning satellites; and the second determining means are for determining the location of the system using a quantity of the plurality of positioning signals, wherein the quantity of the plurality of positioning signals depends upon a position uncertainty of a mobile device.

26. A non-transitory, processor-readable storage medium storing processor-readable instructions configured to cause a processor to:
   determine, for a positioning signal received by an antenna of a device from a positioning satellite, an angle of arrival of the positioning signal relative to the antenna using an orientation sensor;
   apply a phase correction to the positioning signal to produce a phase-corrected signal, the phase correction being based on the angle of arrival, the phase correction corresponding to a phase error that the device is configured to introduce to a signal incident upon the device at the angle of arrival; and
   determine a location of the device using the phase-corrected signal.

27. The storage medium of claim 26, wherein to apply the phase correction the instructions are configured to cause the processor to apply a carrier-phase correction to the positioning signal.

28. The storage medium of claim 26, wherein to apply the phase correction the instructions are configured to cause the processor to apply a code-phase correction to the positioning signal.

29. The storage medium of claim 28, wherein the phase-corrected signal is a code-phase-corrected signal, the instructions further comprising instructions configured to cause the processor to apply a carrier-phase correction to the positioning signal to produce a carrier-phase-corrected signal, and wherein to determine the location of the device the instructions are configured to cause the processor to:
   use the code-phase-corrected signal to determine a coarse location of the device;
   use the coarse location of the device to determine a search window for determining a number of carrier cycles from a satellite to the device; and
   use the carrier-phase-corrected signal to determine a precise location of the device.

30. The storage medium of claim 26, wherein to determine the angle of arrival of the positioning signal, the instructions are configured to cause the processor to:
   determine an orientation of the device relative to a reference;
   determine an estimated location of the device relative to the reference; and
   determine a location of the positioning satellite relative to the estimated location of the device.

31. The storage medium of claim 26, wherein to determine the location of the device the instructions are configured to cause the processor to use a plurality of positioning signals, wherein a quantity of the plurality of positioning signals depends upon a position uncertainty of the device.

* * * * *